Oct. 12, 1937.　　　C. W. SINCLAIR　　　2,095,719
BRAKE DRUM
Filed July 27, 1931　　　3 Sheets-Sheet 2

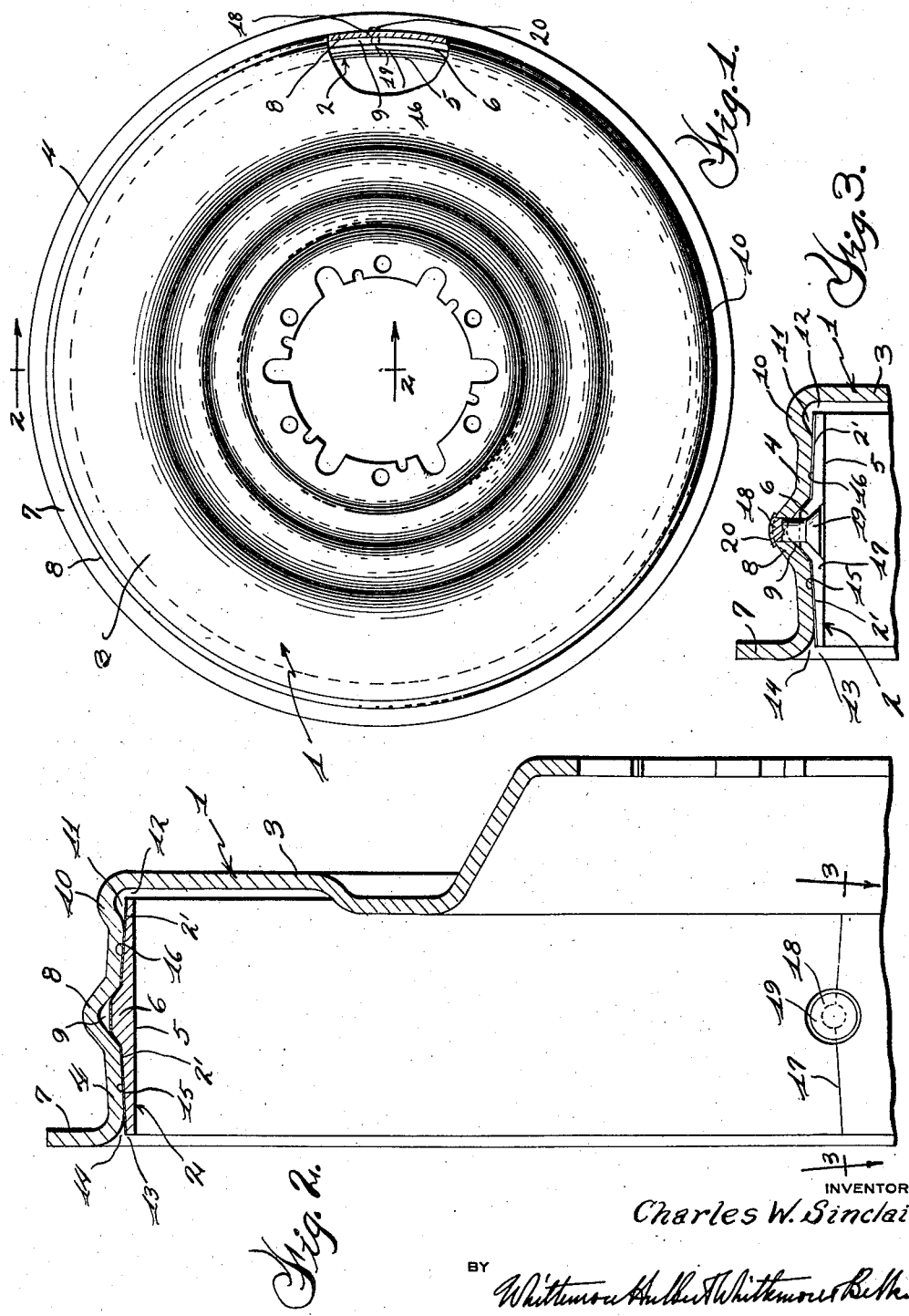

INVENTOR
Charles W. Sinclair
BY Whittemore Hulbert Whittemore Belknap
ATTORNEYS

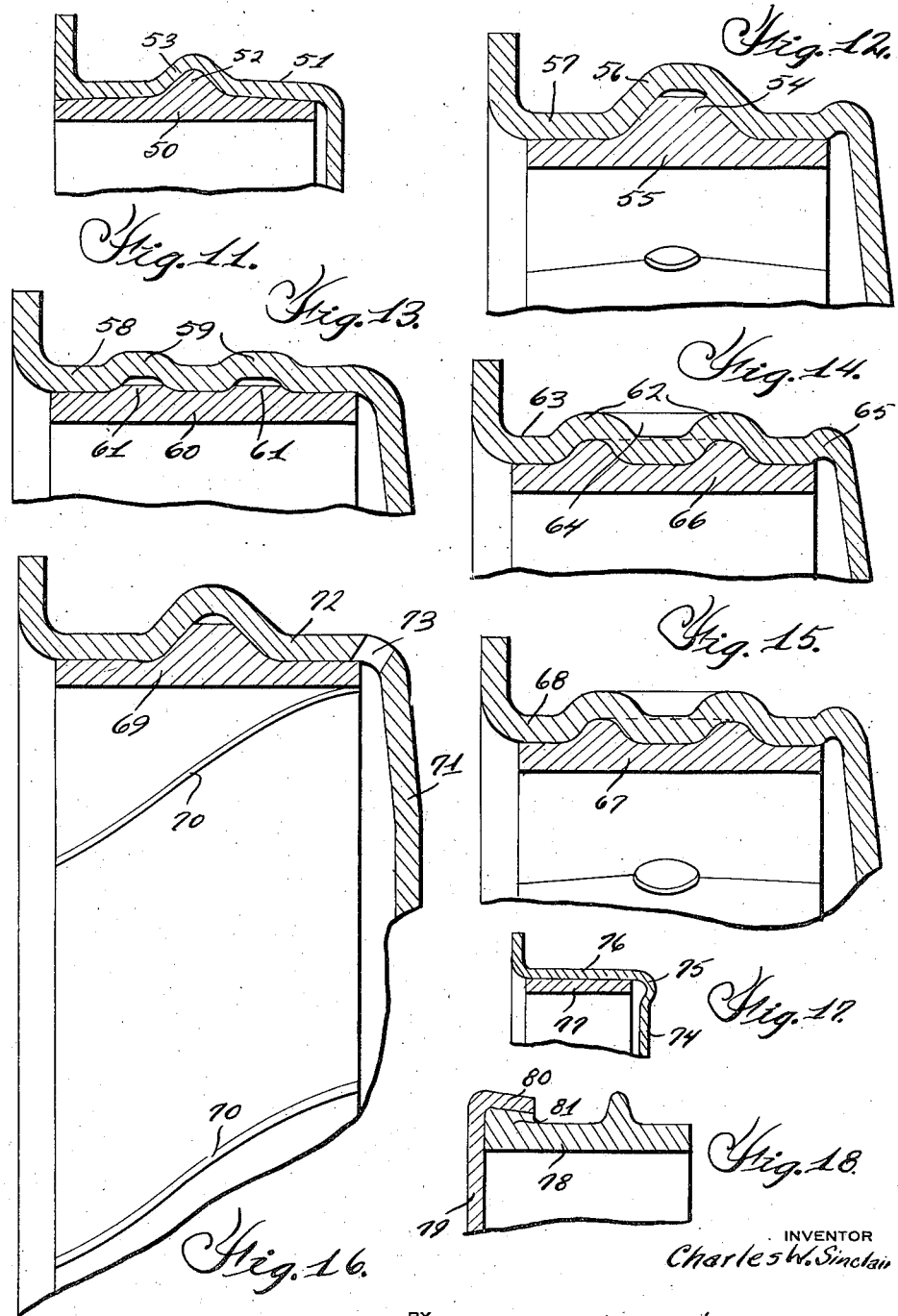

UNITED STATES PATENT OFFICE 2,095,719

BRAKE DRUM

Charles W. Sinclair, Detroit, Mich., assignor, by mesne assignments, to The Kelsey-Hayes Wheel Company, Detroit, Mich., a corporation of Delaware Application July 27, 1931, Serial No. 553,451

22 Claims. (Cl. 188—218)

The invention relates to brake drums and more particularly to brake drums for use with motor vehicles. One of the objects of the invention is to provide a construction of brake drum having greater rigidity and better heat conducting properties than the usual constructions of brake drums with no increase in weight and in fact, a decrease. Another object is to provide an improved construction of brake drum having a body and a separately formed brake engaging member so constructed that the body and member are effectively secured together. A further object resides in an improved manufacture or method of economically forming the brake drum. These and other objects of the invention will become apparent from the following description, taken in connection with the accompanying drawings, in which Figure 1 is an elevation of a brake drum, showing an embodiment of my invention;

Figure 2 is a cross section on the line 2—2 of Figure 1;

Figure 3 is a cross section on the line 3—3 of Figure 2;

Figures 4, 5, 6, 7, 8, 9, 10, 11, 12, 13, 14, 15, 16, 17 and 18 are views similar to Figure 2, showing various embodiments of my invention.

Figure 4:
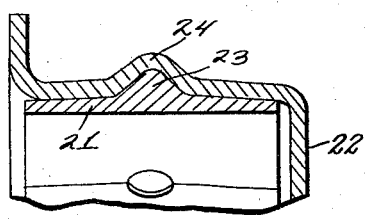

The brake drum, as shown in Figures 1, 2 and 3, comprises the body 1 and the brake engaging member 2, which is in the nature of an annular lining. The body 1 is preferably a pressed or drawn sheet metal cup-shaped drum member having the web 3 and the integral transverse annular flange 4. The lining 2 extends within the flange 4 and preferably has the radially inner cylindrical surface 5 for engagement with the friction members, such as brake shoes, of the braking mechanism. This lining is formed of material having suitable wearing qualities, such as cast iron, high carbon steel, alloy steel, or the like.

For the purpose of increasing the rigidity of the lining and also increasing its heat conducting properties, the lining is provided intermediate its edges with the encircling or annular circumferentially extending rib 6 integral therewith and this rib, as specifically shown, is in the median zone of the lining. For increasing the rigidity of the annular flange 4, this annular flange is provided at its free edge with the radially outwardly extending reinforcing flange 7 and intermediate its edges with the encircling or annular radially outwardly and circumferentially extending hollow reinforcing rib or bead 8, which latter is of a size to receive the rib 6 and to provide the clearance space 9 between these two ribs. The annular flange 4 further has the radially outwardly extending hollow rib or bead 10 at its edge connecting with the web 3 of the drum member and providing the clearance 11 radially outwardly beyond the laterally inner edge of the lining. This latter arrangement provides for expansion of the annular flange without angularly tilting the lining.

The edges of the lining preferably terminate short of the edges of the annular flange to provide the clearances 12 and 13 and, furthermore, the laterally outer edge of the lining is spaced radially inwardly from the outer edge portion of the annular flange to provide the clearance 14. To position and support the lining on the annular flange, the radially outer surface portions 15 and 16 of the lining on opposite sides of the rib 6 are oppositely inclined and, as shown, their inclination is such that the thickness of the lining progressively increases from its edges to its rib. The radially inner surface portions of the annular flange on opposite sides of its rib 8 are correspondingly inclined and tightly engage the inclined surface portions 15 and 16. The arrangement is such that the lining is securely positioned and held in the annular flange by the cooperating inclined surface portions independently of the ribs 6 and 8, so that the latter need not be in contact.

The lining 2 has the transverse split 17 at one point in its length and this split is so shaped that the ends of the lining interfit. More specifically, the split is shaped so that one end of the lining is V-shaped and the other end has a corresponding V-shaped notch. To secure the ends of the lining in registration and more particularly from radial separation, I have provided the securing device 18 extending through the lining at the split intermediate its edges and through the reinforcing rib 8, this device preferably having the tapered head 19 engaging a correspondingly shaped opening formed in the adjacent ends of the lining and the riveted-over head 20 against the radially outer surface of the rib 8. This securing device also extends through the rib 6 and this rib provides sufficient metal for forming the opening to receive the head 19 and still maintain the necessary strength.

In forming the brake drum, the lining 2 is collapsed by overlapping its ends and the annular flange is expanded by heating the same. At this time the lining is inserted within the annular flange and its ends brought into registration with the lining in position such that its radially outer inclined surfaces properly register with the corresponding radially inner inclined surfaces upon the annular flange. The annular flange is then allowed to cool or cooled, so that it will shrink upon the lining, the relative dimensions being such that it forces the ends of the lining into tight engagement. The annular flange and lining may then be drilled to receive the securing device 18, after which the latter may be inserted and riveted into place with its head clearing the radially inner surface of the lining. This radially inner surface may then be finished to true the same, if necessary.

To secure a more effective bond between the brake engaging member or annular lining 2 and the annular flange 4 under all operating conditions and, more particularly, to secure such a bond which becomes more effective as the temperature increases, the annular flange, prior to assembly with the brake engaging member or lining, is expanded to size while cold, so that it is stretched. Furthermore, the brake engaging member or lining, prior to assembly with the annular flange, is preferably formed so that its metal is free of stretching strain. With this structure and the above described method of assembly, the annular flange and the lining are in tight engagement at normal temperature and as the temperature increases the annular flange expands at a slower rate than that of the lining, so that the lining more tightly engages the annular flange. By plating this lining with suitable material 2', such as copper, prior to its assembly with the annular flange better heat conducting contact between the lining and flange is secured, since the material is in intimate contact with the lining and annular flange and has good heat conducting properties.

In the event that the lining is formed of suitable material such as malleable iron, its radially outer surface may be made sufficiently true and smooth by rolling to provide a satisfactory bond when the annular flange is shrunk thereon.

With the above construction, the encircling rib of the brake engaging member or lining reinforces the same to increase its rigidity and also provides an additional mass or body of material to increase the heat absorbing and conducting properties of the brake engaging member or lining. Also the ribs at and intermediate the edges of the annular flange decidedly reinforce and add to the rigidity of this flange, so that it and the body or drum member of which it is a part, may be formed of sheet metal of less gauge than the usual brake drum. Furthermore, the annular flange being stretched prior to being expanded by heat and then shrunk upon the brake engaging member or lining forms a unit therewith and the latter is effectively held from movement relative to the former under all operating conditions.

Figure 4 shows another embodiment of my invention in which the brake engaging member or the annular lining 21 is centrifugally cast prior to assembly with the body 22 of the brake drum. This lining is transversely split in the same manner as that of Figures 1, 2 and 3 and its ends may, if desired, be secured to the annular flange of the brake drum. In this modification the encircling rib 23 of the lining substantially fills the encircling hollow rib 24 of the annular flange, the lining having been centrifugally cast so that its radially outer surface is preformed to the radially inner surface of the annular flange. In this construction the annular flange is stretched and the annular flange and lining are assembled in the same manner as the annular flange and lining of Figures 1, 2 and 3.

Figure 5:
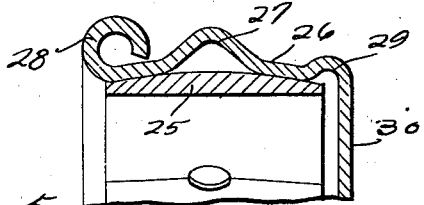

In the modification shown in Figure 5, the brake engaging member or the annular lining 25 does not have an encircling rib intermediate its edges, but this lining progressively increases in thickness from its edges to its median plane, its radially outer surface being arcuate. The annular flange 26 of the brake drum body has intermediate its edges the encircling hollow reinforcing rib or bead 27 and at its free edge the return bent encircling reinforcing hollow flange or bead 28. The portions of the radially inner surface of the annular flange at opposite sides of the hollow rib 27 are arcuate and inclined toward or converge radially outwardly toward each other and the corresponding portions of the radially outer surface of the lining are shaped to fit these portions. The annular flange is provided with the radially outwardly extending hollow rib or bead 29 at its junction with the web 30 of the brake drum providing for expansion of the annular flange without angularly tilting the lining.

Figure 6:
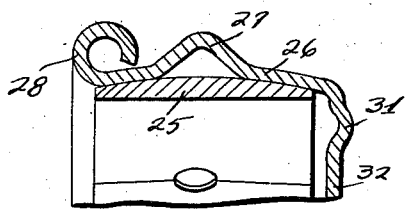

In the modification shown in Figure 6, the parts have the same general arrangement as those shown in Figure 5, with the exception that expansion of the annular flange without angularly tilting the lining is provided for by the annular hollow rib or bead 31 at the periphery of the web 32 of the brake drum body.

Figure 7:
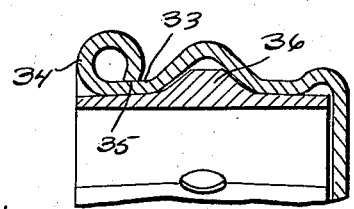

The structure of Figure 7 differs from that of Figure 1, mainly in providing the sheet metal annular flange 33 of the brake drum body with the encircling return bent hollow rib or bead 34 at its free edge and having the radially inwardly extending edge portion 35 contacting with the annular flange between its free edge and the encircling hollow reinforcing rib or bead 36. In this construction the reinforcing rib or bead 34 serves to reinforce the annular flange at two axially or transversely spaced zones.

Figure 8:
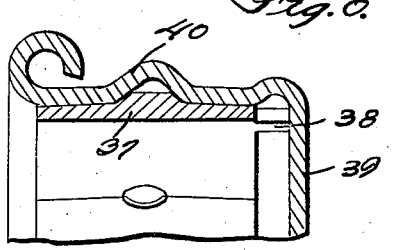

Figure 8 shows another embodiment of my invention which in general is very similar to that shown in Figures 1, 2 and 3, with the exception that the brake engaging member or the annular lining 37 is provided with the axially extending projections or fingers 38 for engaging the web 39 of the brake drum body and positioning the lining relative to the annular flange 40 of the brake drum body during the assembly.

Figure 9:
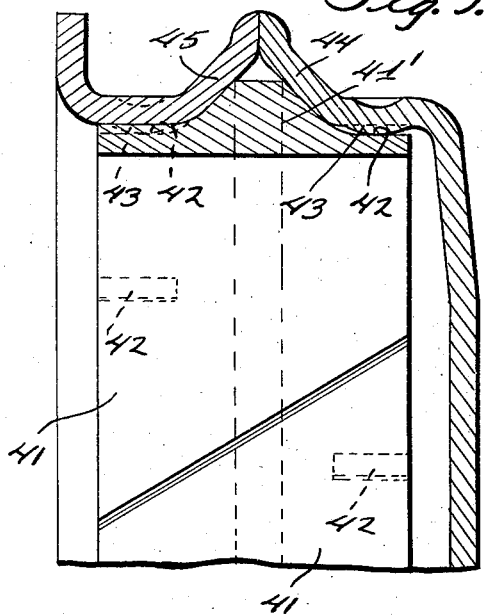

In the modification shown in Figure 9, the brake engaging member or annular lining is formed with a series of arcuate sections 41 in end to end engagement. Each section has extending outwardly from its radially outer surface and intermediate its edges the reinforcing and heat conducting rib section 41' and the rib sections together form an encircling rib. Each section further has in its radially outer surface the depressions or recesses 42 arranged in staggered relation for engagement by the inwardly extending depressions or bosses 43 formed in the annular flange of the brake drum body. This annular flange is formed of sheet metal and is peripherally split intermediate its edges to provide laterally inner and outer sections 44 and 45 respectively, each of which has an inclined portion cooperating with the other to form the annular groove or recess for receiving the rib 41'.

In this construction the sections of the annular flange may be stretched prior to assembly with the brake engaging member or annular lining and in assembling the sections 44 and 45 of the annular flange are expanded by heat and the sections 41 of the annular lining are first inserted into the laterally inner annular flange section 44 with the recesses 42 properly registering with the depressions 43. The expanded annular flange section 45 is then assembled in place and these two annular flange sections are allowed to cool or cooled to shrink upon the sections forming the annular lining to firmly engage and secure the same in place. The adjacent portions of the annular flange sections are suitably fixedly secured to each other, as by means of welding the same radially outwardly beyond the rib 41. The sections 41 forming the annular lining are free of strain prior to assembly with the brake drum body and, more particularly, the annular flange of this body and since the sections forming the annular flange are stretched prior to assembly with the sections forming the annular lining, the resulting construction is one in which the annular lining is very effectively secured to the annular flange under all operating conditions, and especially under temperatures above normal, inasmuch as the annular lining expands at a greater rate than the annular flange.

Figure 10:
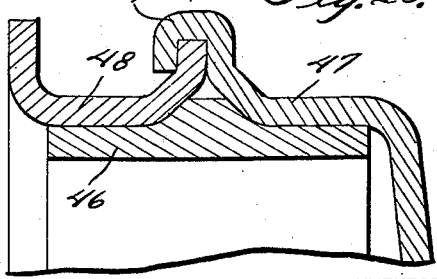

Figure 10 shows a modification of Figure 9 in which the brake engaging member or the annular lining 46 is not formed of a series of arcuate sections. This lining may be either solid and formed as by being centrifugally cast or transversely split in the same manner as shown in Figures 1, 2 and 3. The annular flange forming part of the brake drum body has the laterally inner and outer sections 47 and 48, respectively, which are formed in much the same manner as the sections 44 and 45 of the annular flange of Figure 9, with the exception that the annular flange section 47 is provided with the return bent portion 49 at its free edge for engaging over the adjacent edge portion of the flange 48 and rigidly securing the two flange sections to each other. The method of assembling the lining with the annular flange is the same as that described in connection with Figure 9.

Figure 11 discloses another modification in which the brake engaging member or the annular lining 50 is solid and the annular flange 51 of the brake drum body is shrunk upon this lining. The lining has intermediate its edges and extending radially outwardly the reinforcing rib 52 which engages within the hollow reinforcing rib or bead 53 of the annular flange 51. The height of this reinforcing rib or bead 53 is less than the maximum expansion of the annular flange 51 when subjected to a temperature of approximately 900 to 1100 degrees F. below the critical temperature at which the annular flange scales without a protecting coating, so that when this annular flange has been expanded by heat it provides sufficient clearance for assembling the lining, including its encircling rib 52, therewithin. Then when the annular flange is shrunk upon the lining the rib 52 tightly engages the rib 53.

Figure 12 discloses a modification which differs from that shown in Figures 1, 2 and 3 in that the encircling rib 54 of the brake engaging member or the annular lining 55 has its side portions contacting with the side walls of the encircling circumferentially extending hollow reinforcing rib or bead 56 of the annular flange 57 of the brake drum body.

As shown in Figure 13, the sheet metal annular flange 58 is provided with the annular circumferentially extending spaced hollow reinforcing ribs or beads 59 and the brake engaging member 60 is provided on its radially outer surface with the encircling ribs 61 for engaging within the grooves formed by the ribs 59.

Figure 14 discloses a modification of Figure 13, wherein the encircling circumferentially extending ribs 62 of the sheet metal annular flange 63 are of greater depth than the corresponding ribs 59 and are connected by the transverse or axial hollow ribs or beads 64. The annular flange is also formed at its junction with the web of the brake drum body with the radially outwardly extending hollow rib or bead 65. The annular flange and the brake engaging member or lining may be assembled by separately forming the same, expanding the flange by heat, inserting the member or lining and then shrinking the former upon the latter or by forming the flange, expanding it by heat, centrifugally casting the member or lining within the flange and shrinking the former upon the latter. The brake engaging member or annular lining 66 has on its radially outer surface the circumferentially extending and transversely or axially extending ribs for engaging within the recesses formed by the ribs 62 and 64.

Figure 15 shows a modification of Figures 13 and 14, in which the brake engaging member or the annular lining 67 is centrifugally cast in a mold and transversely split prior to assembly with the annular flange 68 of the sheet metal brake drum body. In this construction no machining of the radially outer surface of the annular lining is required.

Figure 16 discloses a modification of the construction shown in Figure 11 in which the brake engaging member or the annular lining 69 is provided with the transverse and, more particularly, the diagonally extending grooves 70 for receiving loose material, such as dirt, and conducting the same away from the lining. In this construction the portion of the brake drum body at the junction between the web 71 and the annular flange 72 is preferably provided with the elongated openings 73 for the passage of the loose material out of the brake drum. It is apparent that the annular lining may be formed by centrifugally casting the same in a mold, in which event the material forming this lining is substantially free of strain prior to assembly with the brake drum body. It is also apparent that the annular flange of the brake drum body may be expanded to size while cold and its material stretched, so that after the assembling of the lining and the brake drum body by shrinking the latter upon the former an effective bond is secured under all operating conditions.

Figure 17 discloses another embodiment of my invention broadly similar to that shown in Figure 6, in that the web 74 of the sheet metal body or cup-shaped drum member is provided with the annular hollow rib or bead 75 at its periphery and joining into the annular flange 76 to take care of expansion of the annular flange without angularly tilting the annular brake engaging member or lining 77, which may be centrifugally cast, either separately from the brake drum body or directly within the annular flange thereof. In either event, the annular flange is shrunk upon the lining.

In the embodiment of my invention shown in Figure 18, the annular brake engaging member or lining 78 is solid and centrifugally cast in a mold prior to assembly with the sheet metal brake drum body having the web 79 and the annular flange 80. The laterally inner edge portion of the brake engaging member is formed with the radially outwardly extending annular projection 81 having its radially outer surface tapered in a direction toward the median plane of the brake engaging member. The annular flange 80 is correspondingly tapered and is expanded while cold and its metal is in stretched condition prior to assembling with the brake engaging member by expanding the annular flange by heat, assembling the brake engaging member therewithin, and then shrinking the annular flange upon the brake engaging member. Owing to the fact that the annular flange and the radially outer surface of the brake engaging member engageable with this flange are tapered, the brake engaging member is effectively secured in place with its laterally inner edge secured in place against the web of the brake drum body.

What I claim as my invention is:

1. A brake drum, comprising an annular cast brake engaging member, and a stretched sheet metal annular flange shrunk upon said member.

2. A brake drum, comprising an annular brake engaging member, and a stretched annular flange shrunk upon said member.

3. A brake drum, comprising an annular brake engaging member substantially free of stretching strain, and a stretched annular flange shrunk upon said member.

4. A brake drum, comprising a separately formed centrifugally cast annular brake engaging member, and a stretched annular sheet metal flange shrunk upon said member.

5. A brake drum structure comprising an outer drum including a plurality of annular steel body members secured together and providing adjacent complementary abutting portions forming an inwardly opening circumferentially extending groove, and a cast iron liner having an outwardly projecting circumferentially extending rib seating in the groove of said outer drum and having an inner cylindrical braking surface, said outer drum being under tension and said liner being under compression sufficient to maintain said liner and outer drum in engagement as the drum structure is heated in use.

6. A brake drum structure comprising an outer drum including a plurality of annular steel body members secured together and providing adjacent complementary abutting portions forming an inwardly opening circumferentially extending groove, and a cast iron liner having an outwardly projecting circumferentially extending rib seating in the groove of said outer drum and having an inner cylindrical braking surface, said outer drum being under tension and said liner being under compression sufficient to maintain said liner and outer drum in engagement as the drum structure is heated in use, said outer drum and liner further including one or more complementary rib and groove portions extending transversely to the aforesaid circumferential groove and complementary circumferential rib.

7. A brake drum comprising a plurality of steel drum portions each having an outwardly extending circumferential flange, a flange of one drum portion being secured to a flange of another drum portion whereby to provide a drum structure having an outwardly projecting cooling rib, and an inwardly opening circumferentially extending groove, and a cast iron liner having an outwardly projecting circumferentially extending rib seating in the aforesaid groove of the drum structure, said body portion being under tension and said liner being under compression sufficient to maintain said liner and drum structure in engagement as the drum is heated in use.

8. A brake drum including a liner having an outwardly projecting circumferentially extending rib intermediate the ends thereof, and an outer drum structure including a plurality of cylindrical body portions secured together and shrunk on the outer surface of said liner, said portions having adjacent complementary abutting portions forming a circumferential groove for receiving the rib carried by said liner, said body portions being under tension and said liner being under compression sufficient to maintain said liner and body portions in engagement as the drum is heated in use.

9. A brake drum including a liner having an outwardly projecting circumferentially extending rib intermediate the ends thereof, and an outer drum structure including a plurality of cylindrical body portions shrunk on the outer surface of said liner, the abutting end portions of said body portions having outwardly extending flanges secured together and cooperating to provide an inwardly opening groove extending circumferentially of the outer drum structure for receiving the rib of said liner.

10. A brake drum including a liner having an outwardly projecting circumferentially extending rib intermediate the ends thereof, and an outer drum structure including a plurality of cylindrical body portions shrunk on the outer surface of said liner, the abutting end portions of said body portions having outwardly extending flanges secured together and cooperating to provide an inwardly opening groove extending circumferentially of the outer drum structure for receiving the rib of said liner, one of said body portions having an inwardly projecting rib extending substantially axially thereof, said liner having a groove for receiving said axially extending rib.

11. A brake drum including a cast iron drum liner having oppositely tapered outer surface portions, and an outer shell structure housing said liner and secured thereto, said shell structure comprising a plurality of abutting ring members, each of said ring members having tapered inner surface portions engaging one of the tapered portions of said liner.

12. A brake drum including a cast iron drum liner having a circumferentially extending rib, and an outer shell structure housing said liner and secured thereto, said shell structure comprising a plurality of abutting ring members having complementary abutting portions, said abutting portions of said ring members secured together and forming a circumferential groove for receiving said rib.

13. A brake drum including a cast iron drum liner, and an outer shell structure housing said liner, said shell structure comprising a plurality of cylindrical drum portions having outwardly extending abutting flanges secured together and forming a cooling fin structure.

14. A brake drum including a cast iron drum liner, and an outer shell structure housing said liner, said shell structure comprising a plurality of cylindrical drum portions having outwardly extending abutting flanges secured together and forming a cooling fin structure extending circumferentially around said brake drum.

15. A brake drum, comprising a liner having a circumferentially extending rib and an outer drum structure encircling said liner, said outer drum structure having a plurality of ring members secured together and forming a circumferential groove for receiving said rib.

16. A brake drum, comprising an annular brake engaging member, and a sectional annular flange shrunk upon said member.

17. A brake drum, comprising an annular brake engaging member having an encircling rib intermediate its edges, and an annular flange comprising cooperating sections secured to each other and shrunk upon said member and forming an annular groove for receiving said rib.

18. A brake drum, comprising a sectional annular brake engaging member with the sections thereof in end to end engagement, and a sectional annular flange shrunk upon said member.

19. A brake drum ring comprising two cylindrical shells having radially extending cooperating flanges, said shells being arranged with their inner surfaces in axial alignment with said flanges adjacent each other, and means associated with said flanges for rigidly fastening the shells together.

20. A brake drum comprising a head having a laterally extending peripheral ring portion provided with a radially extending flange at the open side thereof, a cylindrical shell having a radially extending flange at one edge thereof, said shell arranged in axial alignment with said ring portion and with its radially extending flange adjacent the radially extending flange of the ring portion, and means associated with said flanges for rigidly fastening the said shell to the brake drum head.

21. A brake drum ring comprising a pair of cylindrical shells, both of said shells having radially extending flanges at both edges thereof, said shells being arranged with their inner surfaces in axial alignment and with their corresponding radially extending flanges adjacent each other, and means associated with said last mentioned flanges for rigidly securing the shells together.

22. A composite brake drum comprising a cylindrical shell having a radially outwardly extending heat dissipating flange and a brake drum head having a laterally extending peripheral portion terminating in a radially extending flange adapted to be secured to said radially extending flange.

CHARLES W. SINCLAIR.